US012766436B2

(12) United States Patent
Otomo

(10) Patent No.: US 12,766,436 B2
(45) Date of Patent: Oct. 20, 2026

(54) ANALYSIS DEVICE

(71) Applicant: SHIMADZU CORPORATION, Kyoto (JP)

(72) Inventor: Iori Otomo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 277 days.

(21) Appl. No.: 18/624,582

(22) Filed: Apr. 2, 2024

(65) Prior Publication Data

US 2024/0345039 A1 Oct. 17, 2024

(30) Foreign Application Priority Data

Apr. 14, 2023 (JP) ................................ 2023-066689

(51) Int. Cl.
*B01D 15/24* (2006.01)
*B01D 15/42* (2006.01)
*G01N 30/20* (2006.01)

(52) U.S. Cl.
CPC ......... *B01D 15/247* (2013.01); *B01D 15/424* (2013.01); *G01N 2030/201* (2013.01); *G01N 2030/202* (2013.01)

(58) Field of Classification Search
CPC ............ G01N 30/00; G01N 2030/965; G01N 2030/201; G01N 2030/202; B01D 15/247; B01D 15/424
See application file for complete search history.

(56) References Cited

U.S. PATENT DOCUMENTS

| | | | | |
|---|---|---|---|---|
| 11,567,044 B2 * | 1/2023 | Matsuoka | ............. | G01N 30/32 |
| 11,573,212 B2 * | 2/2023 | Inoue | ..................... | G01N 30/30 |
| 11,630,088 B2 * | 4/2023 | Yamazaki | .......... | G01N 35/1065 73/61.52 |
| 2019/0212310 A1 * | 7/2019 | Yoshino | ................. | G01N 30/32 |
| 2019/0302065 A1 * | 10/2019 | Yamazaki | ............. | G01N 30/06 |
| 2025/0020618 A1 * | 1/2025 | Nakajima | ........... | G01N 30/468 |

FOREIGN PATENT DOCUMENTS

| | | | | |
|---|---|---|---|---|
| JP | H11304783 A | * 11/1999 | | |
| JP | 2004054710 A | * 2/2004 | ....... | G11B 20/00086 |
| JP | 2010-014559 A | 1/2010 | | |
| WO | WO-2017122261 A1 | * 7/2017 | ............ | G01N 30/16 |

* cited by examiner

*Primary Examiner* — Judy Nguyen
*Assistant Examiner* — James Split
(74) *Attorney, Agent, or Firm* — Renner, Otto, Boisselle, & Sklar, LLP

(57) ABSTRACT

A liquid sending pump supplies an eluent. A first sample supplier supplies a sample to a first separation column used for an analysis of the sample. A second sample supplier supplies a sample to a second separation column used for separation of the sample. A detector detects a sample that has passed through the first separation column or the second separation column. A flow-path switching valve is switchable between a first flow-path state in which an eluent that has been supplied by the liquid sending pump to the first separation column and a sample that has passed through the first separation column to the detector and a second flow-path state in which an eluent that has been supplied by the liquid sending pump and part of a sample that has passed through the second separation column to the detector.

6 Claims, 3 Drawing Sheets

ANALYSIS DEVICE

BACKGROUND

Technical Field

The present disclosure relates to an analysis device.

Description of Related Art

A separation device that separates a sample into components with use of a liquid chromatograph, and fractionates and collects the components into which the sample has been separated. For example, in a preparative liquid chromatograph device described in JP 2010-14559 A, a sample that has been injected into an elution flow path by an injector is introduced into a separation column while being carried by a mobile phase that has been supplied by a liquid sending pump. The sample that has been introduced into the separation column is separated into components and eluted from the separation column.

Part of the sample that has been eluted from the separation column flows into a detection flow path due to a splitter, and is introduced into a photodiode array detector or a mass spectrometry detector while being carried by a mobile phase that has been supplied by a makeup pump. The components of the eluted sample are detected by these detectors. Based on a result of detection, another part of the sample that has been eluted from the separation column is fractionated into predetermined containers for respective components by a fraction collector in the elution flow path.

SUMMARY

Before fractionating the components of the sample in the separation device, an analysis for confirming the components of the sample may be performed in an analysis device. Further, such a configuration for analyzing and separating of the components of a sample may be realized by one analysis device. However, in this case, it is necessary to provide a large number of liquid sending pumps in the analysis device. Therefore, the size of the analysis device is increased, and the cost of the analysis device is increased. This problem is more significant in a case in which liquid is sent with use of a high-pressure gradient system in each of an analysis and separation.

An object of the present disclosure is to provide an analysis device the size and cost of which are prevented from being increased.

One aspect of the present disclosure relates to an analysis device including a liquid sending pump that supplies an eluent, a first separation column used for an analysis of a sample, a first sample supplier that supplies a sample to the first separation column, a second separation column used for separation of a sample, a second sample supplier that supplies a sample to the second separation column, a detector that detects a sample that has passed through the first separation column or the second separation column, and a flow-path switching valve that is switchable between a first flow-path switch state in which the eluent that has been supplied by the liquid sending pump is guided to the first separation column and a sample that has passed through the first separation column to the detector and a second flow-path state in which the eluent that has been supplied by the liquid sending pump and part of a sample that has passed through the second separation column are guided to the detector.

With the present disclosure, it is possible to prevent an increase in size and an increase in cost of an analysis device.

Other features, elements, characteristics, and advantages of the present disclosure will become more apparent from the following description of preferred embodiments of the present disclosure with reference to the attached drawings.

DETAILED DESCRIPTION

(1) Configuration of Analysis Device

Figure 1:
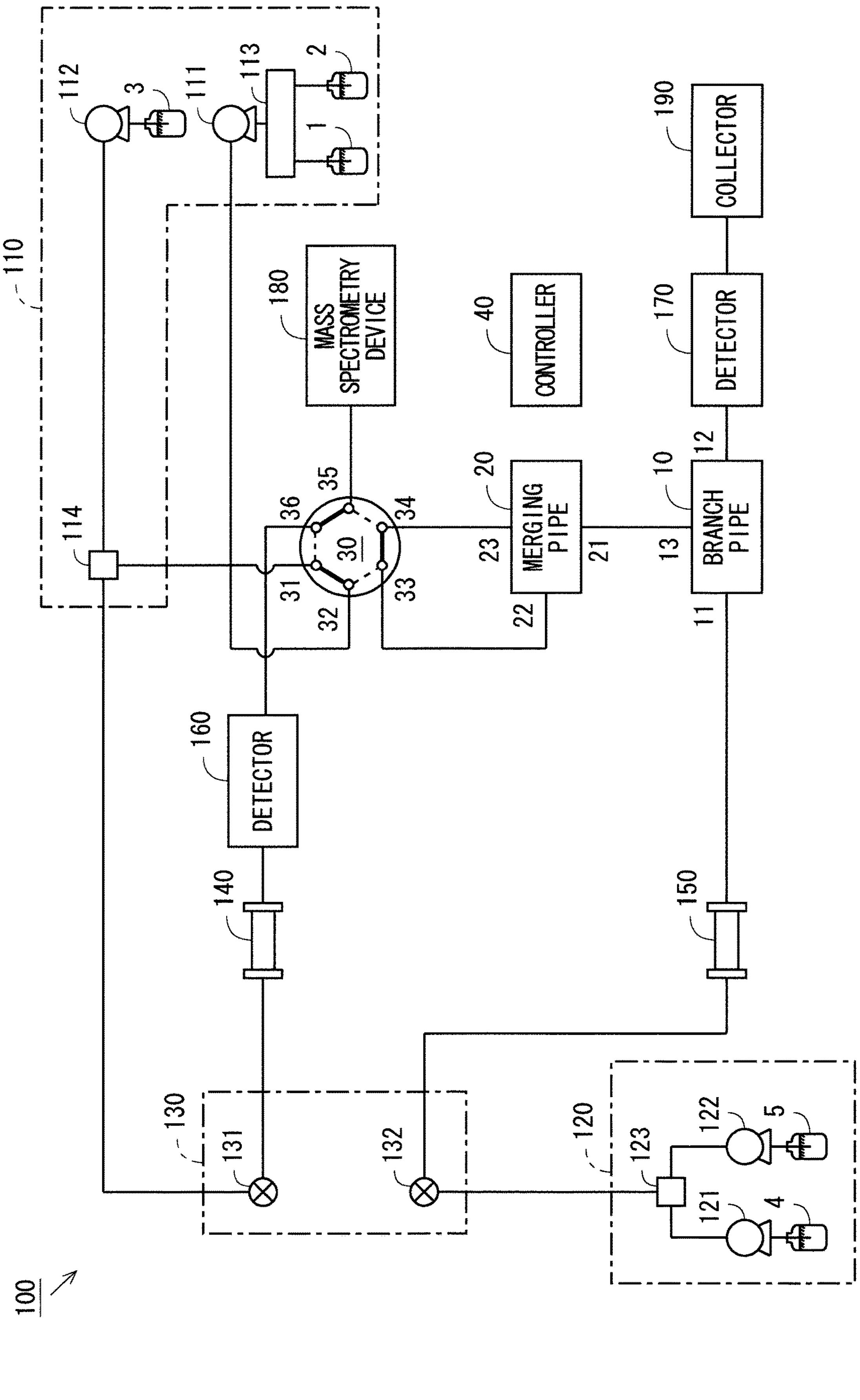
FIG. 1 is a diagram showing the configuration of an analysis device according to one embodiment of the present disclosure.

An analysis device according to embodiments of the present disclosure will be described below in detail with reference to the drawings. FIG. 1 is a diagram showing the configuration of an analysis device according to one embodiment of the present disclosure. As shown in FIG. 1, the analysis device 100 is a liquid chromatograph, for example, and includes eluent suppliers 110, 120, a sample supplier 130, separation columns 140, 150, detectors 160, 170, a mass spectrometer 180 and a collector 190.

The eluent supplier 110 includes liquid sending pumps 111, 112, an eluent switching valve 113 and a mixer 114. Further, in the eluent supplier 110, bottles 1 to 3 storing various eluents are provided. Specifically, mobile phases used for an analysis of a sample are stored in the bottles 1, 3. In the bottle 2, a makeup solution is stored.

The liquid sending pump 111 is an example of a liquid sending pump, and supplies an eluent guided by the eluent switching valve 113. The eluent switching valve 113 selectively guides the mobile phase stored in the bottle 1 and the makeup solution stored in the bottle 2 to the liquid sending pump 111. That is, the liquid sending pump 111 selectively supplies the mobile phase and the makeup solution. The liquid sending pump 112 supplies the mobile phase stored in the bottle 3. The mixer 114 includes a gradient mixer, for example. The mixer 114 sends the mobile phases that has been supplied by the liquid sending pumps 111, 112 using a high-pressure gradient system.

The eluent supplier 120 includes liquid sending pumps 121, 122 and a mixer 123. Further, in the eluent supplier 120, bottles 4, 5 storing mobile phases used for an analysis of a sample are provided. The liquid sending pumps 121, 122 supply the mobile phases stored in the bottles 4, 5, respectively. The mixer 123 includes a gradient mixer, for example. The mixer 123 sends the mobile phases that has been supplied by the liquid sending pumps 121, 122 using a high-pressure gradient system.

The sample supplier 130 is a liquid handler, for example, and includes two injection ports 131, 132. The injection ports 131, 132 are examples of first and second sample suppliers, respectively. The sample supplier 130 selectively supplies a sample from the injection ports 131, 132. A sample that has been supplied from the injection port 131 is introduced into the separation column 140 together with a mobile phase that has been supplied by the eluent supplier 110. A sample that has been supplied by the injection port

132 is introduced into the separation column 150 together with a sample phase that has been supplied by the eluent supplier 120.

The separation column 140 is accommodated in a column oven (not shown) and maintained to have a predetermined constant temperature. The separation column 140 is an example of a first separation column and is used for an analysis of a sample. Specifically, the separation column 140 separates a sample that has been introduced from the injection port 131 of the sample supplier 130 together with a mobile phase that has been supplied by the eluent supplier 110 into components according to differences in chemical property or composition.

The separation column 150 is accommodated in a column oven (not shown) and maintained to have a predetermined constant temperature. In the present example, the separation column 150 has a larger volume than that of the separation column 140. The separation column 150 may be accommodated in a column oven in which the separation column 140 is accommodated. The separation column 150 is an example of a second separation column and is used for separation of a sample. Specifically, the separation column 150 separates a sample that has been introduced from the injection port 132 of the sample supplier 130 together with a mobile phase that has been supplied by the eluent supplier 120 into components according to differences in chemical property or composition.

Each of the detectors 160, 170 is a PDA (photodiode array), a UV (ultraviolet) detector or an absorbance detector, for example. The detector 160 is provided at a position farther downstream than the separation column 140 and detects the components of a sample has passed through the separation column 140. The detector 170 is provided at a position farther downstream than the separation column 150 and detects the components of a sample that has passed through the separation column 150.

The mass spectrometer 180 is an example of a detector. The mass spectrometer 180 detects the components of a sample by ionizing the sample that has passed through the separation column 140 or the separation column 150 and performing mass spectrometry on the ionized sample. The collector 190 includes a fraction collector, for example. The collector 190 is provided at a position farther downstream than the detector 170 and collects a sample that has passed through the separation column 150.

Further, the analysis device 100 further includes a branch pipe 10, a merging pipe 20, a flow-path switching valve 30 and a controller 40. The branch pipe 10 includes an inlet pipe 11 and two outlet pipes 12, 13. The merging pipe 20 includes two inlet pipes 21, 22 and an outlet pipe 23. The inlet pipes 21, 22 are examples of first and second inlet pipes, respectively. The inlet pipe 11 of the branch pipe 10 is connected to a position farther downstream than the separation column 150. The outlet pipe 12 of the branch pipe 10 is connected to the detector 170. The outlet pipe 13 of the branch pipe 10 is connected to the inlet pipe 21 of the merging pipe 20.

The flow-path switching valve 30 is a multi-way switching valve, for example, and includes six ports 31 to 36. The ports 31 to 36 are examples of first to sixth ports, respectively. The port 31 is connected to the mixer 114 of the eluent supplier 110. The port 32 is connected to the liquid sending pump 111 of the eluent supplier 110. The port 33 is connected to the inlet pipe 22 of the merging pipe 20. The port 34 is connected to the outlet pipe 23 of the merging pipe 20. The port 35 is connected to the mass spectrometer 180. The port 36 is connected to the detector 160.

The flow-path switching valve 30 is switchable between a first flow-path state and a second flow-path state. In the first flow-path state, the ports 31, 32 are connected to each other, the ports 33, 34 are connected to each other, and the ports 35, 36 are connected to each other. In the second flow-path state, the ports 32, 33 are connected to each other, the ports 34, 35 are connected to each other, and the ports 36, 31 are connected to each other.

The controller 40 includes a CPU (Central Processing Unit) and a memory, or a microcomputer, for example, and controls the operation of each component of the analysis device 100. Further, the controller 40 generates data such as a chromatogram based on a result of detection by the detectors 160, 170 or the mass spectrometer 180. The generated data is used for confirmation of the components of a sample or control of the operation of each component of the analysis device 100.

(2) Operation of Analysis Device

Figure 2:
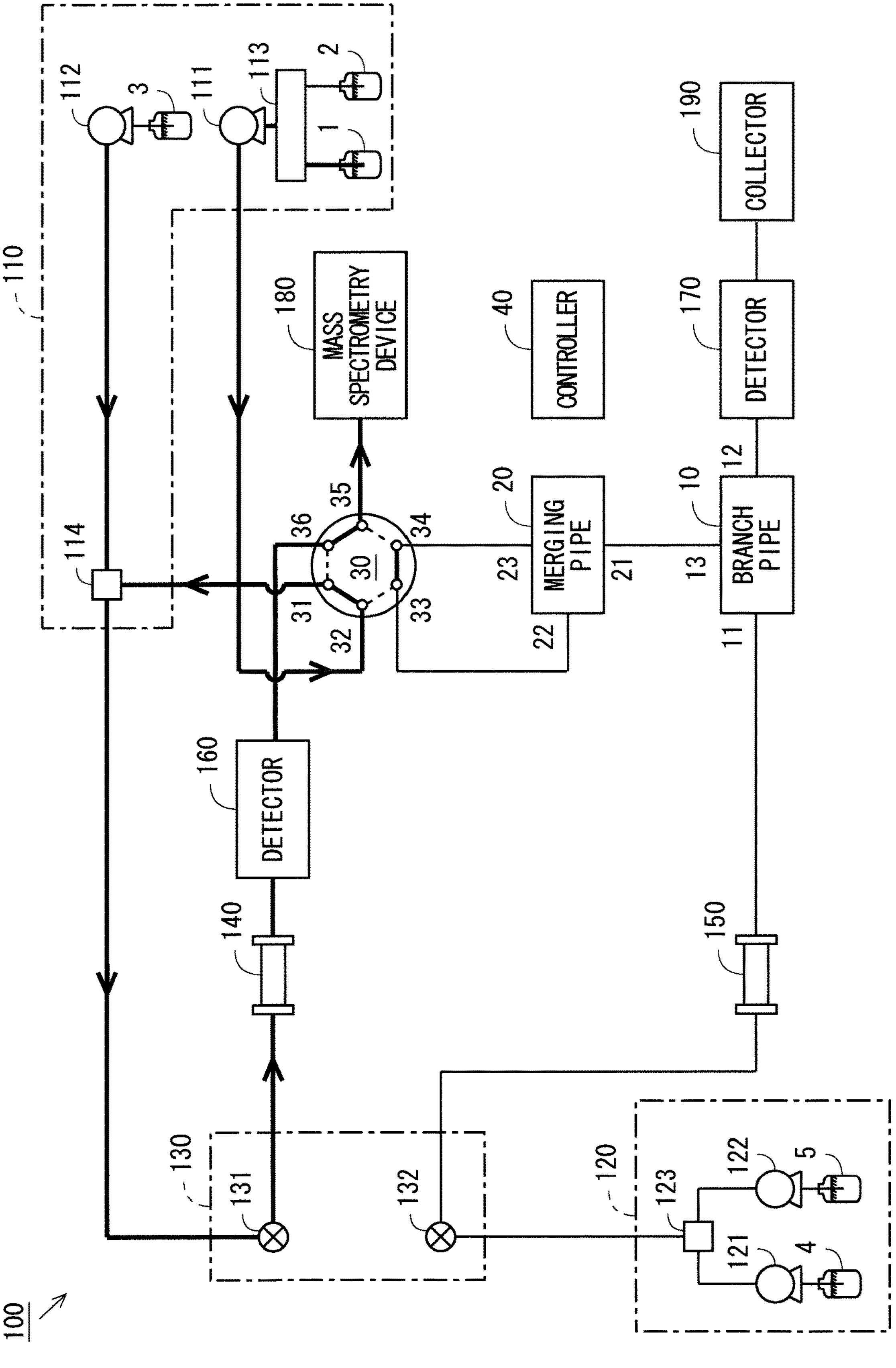
FIG. 2 is a diagram for explaining an analysis operation of the analysis device.

The analysis device 100 selectively performs an analysis operation and a separating operation. FIG. 2 is a diagram for explaining the analysis operation of the analysis device 100. As shown in FIG. 2, during the analysis operation, the flow-path switching valve 30 is in the first flow-path state. Further, the eluent switching valve 113 of the eluent supplier 110 connects the bottle 1 and the liquid sending pump 111 to each other such that the mobile phase stored in the bottle 1 is guided to the liquid sending pump 111. Thus, the flow path indicated by the thick solid lines in FIG. 2 is formed.

During the analysis operation, the liquid sending pump 111 supplies the mobile phase stored in the bottle 1. Further, the liquid sending pump 112 supplies the mobile phase stored in the bottle 3. The mobile phase that has been supplied by the liquid sending pump 111 is introduced into the mixer 114 of the eluent supplier 110 through the ports 32, 31 of the flow-path switching valve 30. The mixer 114 sends the mobile phase that has been supplied by the liquid sending pump 111 through the flow-path switching valve 30 and the mobile phase that has been supplied by the liquid sending pump 112 while continuously changing the ratio.

The sample supplier 130 collects a sample to be analyzed from any vial held by a tray (not shown) and supplies the sample to the flow path from the injection port 131. The sample that has been supplied from the injection port 131 is introduced into the separation column 140 together with the mobile phase that has been supplied by the mixer 114. In the following description, a sample included in a mobile phase is simply referred to as a sample. The separation column 140 separates the introduced sample into components. The sample that has been separated into components by the separation column 140 is introduced into the detector 160.

The detector 160 detects the components of the introduced sample. The components of the sample are led out from a position farther downstream than the detector 160. The components of the sample that has been led out from the detector 160 are introduced into the mass spectrometer 180 through the ports 36, 35 of the flow-path switching valve 30. The mass spectrometer 180 detects the components of the sample by performing mass spectrometry on the components of the introduced sample.

In this manner, during the analysis operation, the flow-path switching valve 30 is switched to the first flow-path state. Thus, the mobile phase that has been supplied by the liquid sending pump 111 is guided to the separation column 140, and the sample that has passed through the separation column 140 is guided to the mass spectrometer 180. The controller 40 generates data such as a liquid chromatogram or a mass chromatogram based on a result of detection by the detector 160 or the mass spectrometer 180. The generated data is used for confirmation of the components of a sample to be analyzed.

Figure 3:
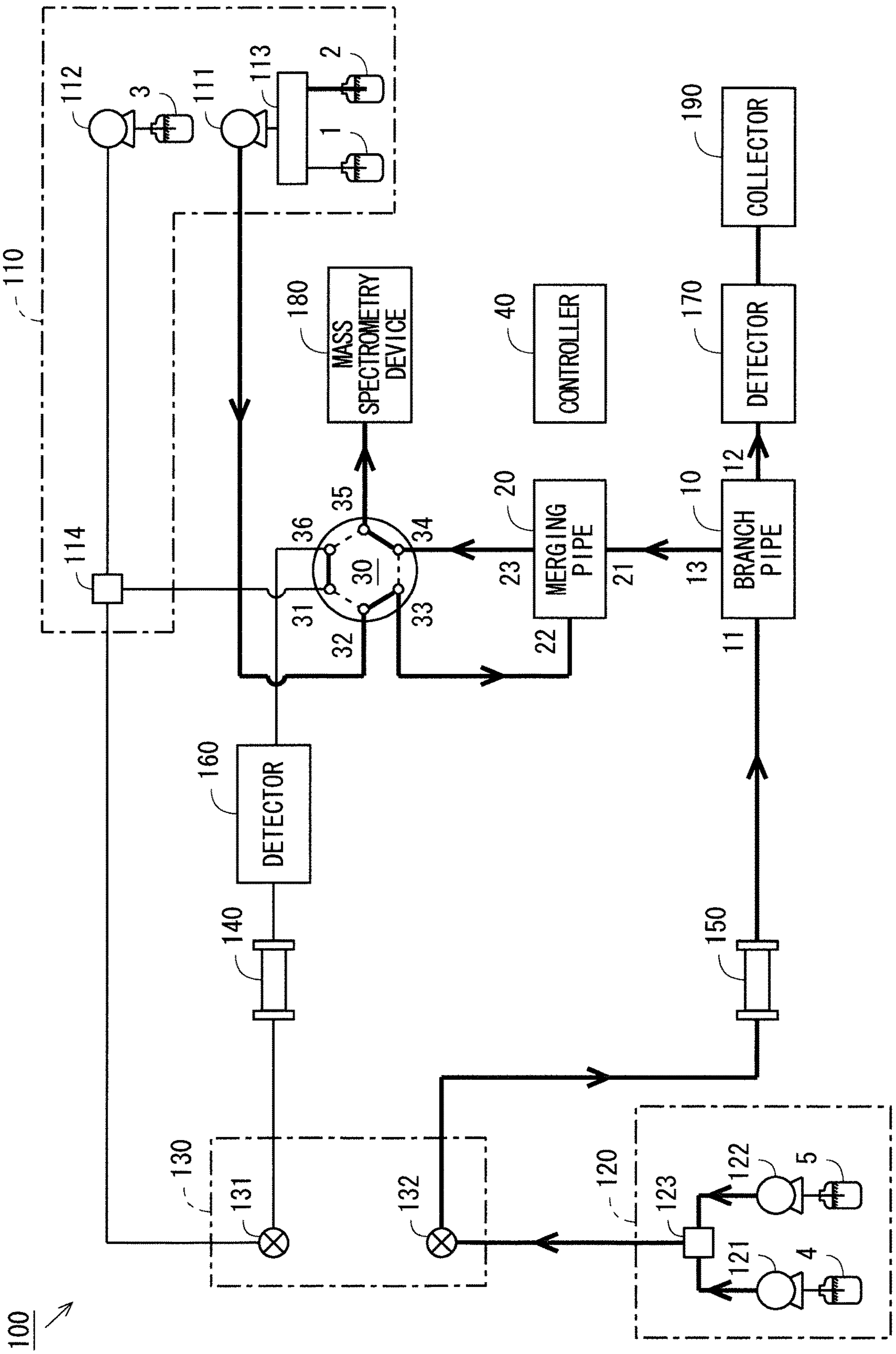
FIG. 3 is a diagram for explaining a separating operation of the analysis device.

FIG. 3 is a diagram for explaining the separating operation of the analysis device 100. As shown in FIG. 3, during the separating operation, the flow-path switching valve 30 is in the second flow-path state. Further, the eluent switching valve 113 of the eluent supplier 110 connects the bottle 2 and the liquid sending pump 111 to each other such that the makeup solution stored in the bottle 2 is guided to the liquid sending pump 111. Thus, the flow path indicated by the thick solid lines in FIG. 3 is formed.

During the separating operation, the liquid sending pump 121 of the eluent supplier 120 supplies the mobile phase stored in the bottle 4. Further, the liquid sending pump 122 supplies the mobile phase stored in the bottle 5. The mixer 123 sends the mobile phase that has been supplied by the liquid sending pump 121 and the mobile phase that has been supplied by the liquid sending pump 122 while continuously changing the ratio.

The sample supplier 130 collects a sample of the same type as that of a sample that has been analyzed during the analysis operation from a vial held by the tray (not shown) and supplies the sample to the flow path from the injection port 132. The sample that has been supplied from the injection port 132 is introduced into the separation column 150 together with the mobile phase that has been supplied by the mixer 123. The separation column 150 separates the introduced sample into components. Because the volume of the separation column 150 is larger than the volume of the separation column 140, an amount of sample larger than that of a sample to be separated in the separation column 140 can be separated into components.

The sample that has been separated into components by the separation column 150 is introduced to the inlet pipe 11 of the branch pipe 10. The components of the sample that has been introduced into the inlet pipe 11 are led out from each of the outlet pipes 12, 13. The volume of the sample led out from the outlet pipe 12 is larger than the volume of the sample led out from the outlet pipe 13. The ratio of the volume of the sample led out from the outlet pipe 12 to the volume of the sample led out from the outlet pipe 13 is 2000:1, for example.

The components of the sample that has been led out from the outlet pipe 12 of the branch pipe 10 are introduced into the detector 170. The detector 170 detects the introduced components of the sample. The components of the sample are led out from a position farther downstream than the detector 170 and introduced into the collector 190. The collector 190 collects the introduced sample in different containers corresponding to the respective components based on the data generated by the controller 40.

On the other hand, the components of the sample that has been led out from the outlet pipe 13 of the branch pipe 10 are introduced into the inlet pipe 21 of the merging pipe 20. Further, the liquid sending pump 111 of the eluent supplier 110 supplies the makeup solution stored in the bottle 2. The makeup solution that has been supplied by the liquid sending pump 111 is introduced into the inlet pipe 22 of the merging pipe 20 through the ports 32, 33 of the flow-path switching valve 30. The components of the sample that has been introduced into the inlet pipe 21 are led out from the outlet pipe 23 together with the makeup solution that has been introduced into the inlet pipe 22.

The components of the sample that has been led out from the outlet pipe 23 of the merging pipe 20 are transported by the makeup solution and introduced into the mass spectrometer 180 through the ports 34, 35 of the flow-path switching valve 30. Thus, even in a case in which the volume of the sample is small, the components of the sample can be efficiently introduced into the mass spectrometer 180. Further, ionization efficiency and detection sensitivity of a sample in the mass spectrometer 180 can be improved. The mass spectrometer 180 performs mass spectrometry on the components of an introduced sample, thereby detecting the components of the sample.

In this manner, during the separating operation, the flow-path switching valve 30 is switched to the second flow-path state. Thus, the make-up solution that has been supplied by the liquid sending pump 111 and part of the sample that has passed th rough the separation column 150 are guided to the mass spectrometer 180. The controller 40 generates data such as a liquid chromatogram or a mass chromatogram based on a result of detection by the detector 170 or the mass spectrometer 180. The generated data is used for collection of each component of the sample by the collector 190.

(3) Effects

In the analysis device 100 according to the present embodiment, an eluent is supplied by the liquid sending pump 111. The sample supplier 130 supplies a sample from the injection port 131 to the separation column 140 used for an analysis of a sample. The sample supplier 130 supplies a sample from the injection port 132 to the separation column 150 used for separation of a sample. A sample that has passed through the separation column 140 or the separation column 150 is detected by the mass spectrometer 180.

Here, the flow-path switching valve 30 is switched between the first flow-path state and the second flow-path state. In the first flow-path state, an eluent that has been supplied by the liquid sending pump 111 is guided to the separation column 140, and a sample that has passed through the separation column 140 is guided to the mass spectrometer 180. In the second flow-path state, an eluent that has been supplied by the liquid sending pump 111 and part of a sample that has passed through the separation column 150 are guided to the mass spectrometer 180.

With this configuration, the flow-path switching valve 30 is switched between the first flow-path state and the second flow-path state, whereby an analysis of a sample with use of the separation column 140 and separation of a sample with use of the separation column 150 are selectively carried out. The supply of an eluent to the separation column 140 and the introduction of a sample after separation into the mass spectrometer 180 in the analysis operation, and the introduction of a sample after separation into the mass spectrometer 180 in the separating operation, can be carried out by the common liquid sending pump 111.

In this case, it is not necessary to separately provide a liquid sending pump for supplying an eluent to the separation column 140 and introducing a sample after separation into the mass spectrometer 180 in the analysis operation and a liquid sending pump for introducing a sample after separation into the mass spectrometer 180 in the separating operation. This can prevent an increase in size and an increase in cost of the analysis device 100.

Further, the supply of a sample to the separation column 140 and the supply of a sample to the separation column 150 are selectively carried out by the common sample supplier 130. In this case, it is not necessary to separately provide a sample supplier for supplying a sample to the separation column 140 and a sample supplier for supplying a sample to the separation column 150. This can prevent an increase in size and an increase in cost of a separation system.

A mobile phase used for an analysis of a sample and a make-up solution are selectively guided to the liquid sending pump 111 by the eluent switching valve 113. The liquid sending pump 111 supplies the eluent guided by the eluent switching valve 113. In this case, it is possible to appropriately analyze the sample using the appropriate mobile phase as an eluent and appropriately separate the sample using the appropriate makeup solution as an eluent while preventing an increase in size and an increase in cost of the analysis device 100.

In the flow-path switching valve 30, the port 31 is connected to the mixer 114 located at a position farther upstream than the separation column 140, and the port 32 is connected to the liquid sending pump 111. The port 33 is connected to the inlet pipe 22 of the merging pipe 20, and the port 34 is connected to the outlet pipe 23 of the merging pipe 20. The port 35 is connected to the mass spectrometer 180, and the port 36 is connected to the detector 160 located at a position farther downstream than the separation column 140. Further, the inlet pipe 11 of the branch pipe 10 is connected to a position farther downstream than the separation column 150, and the inlet pipe 21 of the merging pipe 20 is connected to the outlet pipe 13 of the branch pipe 10.

In the first flow-path state, the ports 31, 32 are connected to each other, the ports 33, 34 are connected to each other, and the ports 35, 36 are connected to each other. In the second flow-path state, the ports 32, 33 are connected to each other, the ports 34, 35 are connected to each other, and the ports 36, 31 are connected to each other. In this case, with a simple configuration, with use of the common liquid sending pump 111, it is possible to supply an eluent to the separation column 140 and introduce a sample after separation to the mass spectrometer 180 during the analysis operation, and introduce a sample after separation to the mass spectrometer 180 during the separating operation.

(4) Other Embodiments (a) While the eluent supplier 110 includes the two liquid sending pumps 111, 112 in the above-mentioned embodiment, the embodiment is not limited to this. The eluent supplier 110 is simply required to include the liquid sending pump 111, and does not have to include the liquid sending pump 112. In this case, the eluent supplier 110 does not include the mixer 114. Therefore, the port 31 of the flow-path switching valve 30 is connected to a position farther upstream than the separation column 140 (the injection port 131 of the sample supplier 130, for example).

While the eluent supplier 120 similarly includes the two liquid sending pumps 121, 122, the embodiment is not limited to this. The eluent supplier 120 is simply required to include one of the liquid sending pumps 121, 122, and does not have to include the other one of the liquid sending pumps 121, 122. In this case, the eluent supplier 120 does not include the mixer 123.

(b) While different eluents are used as a mobile phase and a makeup solution in the above-mentioned embodiment, the embodiment is not limited to this. The same eluent may be used as a mobile phase and a makeup solution. In this case, the eluent supplier 110 does not include the eluent switching valve 113.

(c) While the common sample supplier 130 supplies a sample to the separation column 140 and supplies a sample to the separation column 150 in the above-mentioned embodiment, the embodiment is not limited to this. A sample supplier for supplying a sample to the separation column 140 and a sample supplier for supplying a sample to the separation column 150 may be separately provided.

(d) In the above-mentioned embodiment, the analysis device 100 includes the collector 190 that collects another part of a sample that has passed through the separation column 150. In this case, a sample can be easily separated. However, the embodiment is not limited to this. The analysis device 100 does not have to include the collector 190.

(e) In the above-mentioned embodiment, the mass spectrometer 180 is used to detect a sample. In this case, the components of a sample that has passed through the separation column 140 or the separation column 150 can be analyzed in detail. However, the embodiment is not limited to this. Another detector may be used to detect a sample. During the separating operation, even in a case in which the volume of a sample led out from the outlet pipe 13 of the branch pipe 10 is small, because the sample is transported by an eluent supplied by the liquid sending pump 111, a desired detector can be used to detect the sample.

(f) While the analysis device 100 includes the detectors 160, 170 in the above-mentioned embodiment, the embodiment is not limited to this. The components of a sample can be detected by the mass spectrometer 180. Therefore, the analysis device 100 does not have to include one of the detectors 160, 170 or either one of the detectors 160, 170.

(5) Aspects

It is understood by those skilled in the art that the plurality of above-mentioned illustrative embodiments are specific examples of the below-mentioned aspects.

(Item 1) An analysis device according to one aspect may include a liquid sending pump that supplies an eluent, a first separation column used for an analysis of a sample, a first sample supplier that supplies a sample to the first separation column, a second separation column used for separation of a sample, a second sample supplier that supplies a sample to the second separation column, a detector that detects a sample that has passed through the first separation column or the second separation column, and a flow-path switching valve that is switchable between a first flow-path switch state in which the eluent that has been supplied by the liquid sending pump is guided to the first separation column and a sample that has passed through the first separation column to the detector and a second flow-path state in which the eluent that has been supplied by the liquid sending pump and part of a sample that has passed through the second separation column are guided to the detector.

In the analysis device, with the common liquid sending pump, it is possible to supply an eluent to the first separation column and introduce a sample after separation into the detector in the analysis operation, and introduce a sample after separation into the detector in the separating operation. Therefore, it is not necessary to separately provide a liquid sending pump for supplying an eluent to the first separation column and introducing a sample after separation into the detector in the analysis operation and a liquid sending pump for introducing a sample after separation into the detector in the separating operation. This can prevent an increase in size and an increase in cost of the analysis device.

(Item 2) The analysis device according to item 1 may further include a collector that collects another part of the sample that has passed through the second separation column.

In this case, a sample can be easily separated.

(Item 3) The analysis device according to item 1 or 2, wherein the first sample supplier and the second sample supplier may be constituted by a common sample supplier that selectively supplies a sample to the first separation column and supplies a sample to the second separation column.

In this case, it is not necessary to separately provide the first sample supplier and the second sample supplier. This can prevent an increase in size and an increase in cost of a separation system.

(Item 4) The analysis device according to any one of items 1 to 3, wherein the detector may include a mass spectrometer.

In this case, the components of a sample that has passed through the first separation column or the second separation column can be analyzed in detail.

(Item 5) The analysis device according to any one of items 1 to 4, may further include an eluent switching valve that selectively guides a mobile phase used for an analysis of a sample and a makeup solution as the eluent, wherein the liquid sending pump may supply the eluent that has been guided by the eluent switching valve.

In this case, it is possible to appropriately analyze a sample using an appropriate mobile phase as an eluent and appropriately separate a sample using an appropriate makeup solution as an eluent while preventing an increase in size and an increase in cost of the analysis device.

(Item 6) The analysis device according to any one of items 1 to 5, may further include a merging pipe that includes a first inlet pipe connected to a position farther downstream than the second separation column, a second inlet pipe and an outlet pipe, wherein the flow-path switching valve includes a first port connected to a position farther upstream than the first separation column, a second port connected to the liquid sending pump, a third port connected to the second inlet pipe of the merging pipe, a fourth port connected to the outlet pipe of the merging pipe, a fifth port connected to the detector, and a sixth port connected to a position farther downstream than the first separation column, in the first flow-path state, the first port and the second port may be connected to each other, the third port and the fourth port may be connected to each other, and the fifth port and the sixth port may be connected to each other, and in the second flow-path state, the second port and the third port may be connected to each other, the fourth port and the fifth port may be connected to each other, and the sixth port and the first port may be connected to each other.

In this case, with a simple configuration, with use of the common liquid sending pump, it is possible to supply an eluent to the first separation column and introduce a sample after separation to the detector during the analysis operation, and introduce a sample after separation to the detector during the separating operation.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An analysis device comprising:

a liquid sending pump that supplies an eluent;

a first separation column used for an analysis of a sample;

a first sample supplier that supplies a sample to the first separation column;

a second separation column used for separation of a sample;

a second sample supplier that supplies a sample to the second separation column;

a detector that detects a sample that has passed through the first separation column or the second separation column; and a flow-path switching valve that is switchable between a first flow-path switch-state in which the eluent that has been supplied by the liquid sending pump is guided to the first separation column and a sample that has passed through the first separation column is guided to the detector and a second flow-path state in which the eluent that has been supplied by the liquid sending pump and part of a sample that has passed through the second separation column are guided to the detector; and a merging pipe that is provided at a position farther downstream than the second separation column and includes a first inlet pipe, a second inlet pipe and an outlet pipe, wherein the first inlet pipe is connected to the second separation column, the flow-path switching valve connects the liquid sending pump to a position farther upstream than the first sample supplier in the first flow-path state, and the flow path switching valve connects the liquid sending pump to the second inlet pipe and connects the detector to the outlet pipe in the second flow-path state.

2. The analysis device according to claim 1, further comprising a collector that collects another part of the sample that has passed through the second separation column.

3. The analysis device according to claim 1, wherein the first sample supplier and the second sample supplier are constituted by a common sample supplier that selectively supplies a sample to the first separation column and supplies a sample to the second separation column.

4. The analysis device according to claim 1, wherein the detector includes a mass spectrometer.

5. The analysis device according to claim 1, further comprising an eluent switching valve that selectively guides a mobile phase used for an analysis of a sample and a makeup solution as the eluent, wherein the liquid sending pump supplies the eluent that has been guided by the eluent switching valve.

6. The analysis device according to claim 1, wherein the flow-path switching valve includes a first port connected to a position farther upstream than the first separation column, a second port connected to the liquid sending pump, a third port connected to the second inlet pipe of the merging pipe, a fourth port connected to the outlet pipe of the merging pipe, a fifth port connected to the detector, and a sixth port connected to a position farther downstream than the first separation column, in the first flow-path state, the first port and the second port are connected to each other, the third port and the fourth port are connected to each other, and the fifth port and the sixth port are connected to each other, and in the second flow-path state, the second port and the third port are connected to each other, the fourth port and the fifth port are connected to each other, and the sixth port and the first port are connected to each other.

* * * * *